United States Patent
Wald et al.

(10) Patent No.: US 9,186,998 B2
(45) Date of Patent: Nov. 17, 2015

(54) METHOD FOR OPERATING AN ELECTRICAL SYSTEM, AND APPARATUS FOR CONTROLLING AN ELECTRICAL SYSTEM

(75) Inventors: Klaus-Juergen Wald, Weil Der Stadt (DE); Martin Wirth, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 14/233,951

(22) PCT Filed: Jul. 4, 2012

(86) PCT No.: PCT/EP2012/062978
§ 371 (c)(1),
(2), (4) Date: Jan. 21, 2014

(87) PCT Pub. No.: WO2013/010790
PCT Pub. Date: Jan. 24, 2013

(65) Prior Publication Data
US 2014/0152093 A1    Jun. 5, 2014

(30) Foreign Application Priority Data

Jul. 21, 2011   (DE) .................. 10 2011 079 566

(51) Int. Cl.
*B60L 11/12*   (2006.01)
*B60L 3/00*   (2006.01)
(Continued)

(52) U.S. Cl.
CPC ............... *B60L 11/12* (2013.01); *B60L 3/0046* (2013.01);
(Continued)

(58) Field of Classification Search
CPC .... B60K 6/445; B60K 1/02; B60K 2001/005; B60K 28/10; B60L 3/04; B60L 11/1861; B60L 11/1872; B60L 15/20; B60L 3/003; B60L 11/12; B60L 7/14; B60L 3/0046; B60L 11/14; B60L 11/123; B60L 2210/40; B60L 2260/28; B60L 2240/427; B60L 2240/421; B60W 10/08; B60W 20/00; B60W 2050/021; B60W 2510/244; Y02T 10/6217; Y02T 10/642; Y02T 10/7241; Y02T 10/7077

USPC .................. 180/6.48, 6.5, 65.1, 65.21, 65.22, 180/65.285, 65.31
See application file for complete search history.

(56) References Cited

U.S. PATENT DOCUMENTS

| | | | |
|---|---|---|---|
| 2001/0048226 A1* | 12/2001 | Nada ........................... | 290/40 C |
| 2006/0052915 A1* | 3/2006 | Sato ............................... | 701/22 |

(Continued)

FOREIGN PATENT DOCUMENTS

| | | |
|---|---|---|
| EP | 1157873 | 11/2001 |
| EP | 1603224 | 12/2005 |

(Continued)

OTHER PUBLICATIONS

International Search Report for Application No. PCT/EP2012/062978 dated Sep. 26, 2013 (English Translation, 3 pages).

*Primary Examiner* — Joseph Rocca
*Assistant Examiner* — Bridget Avery
(74) *Attorney, Agent, or Firm* — Michael Best & Friedrich LLP

(57) ABSTRACT

A method for operating an electrical system in a motor vehicle having two electrical machines connected to the electrical system via one controllable inverter each. A regulated generator mode is initiated. A first step detects a drop below a first predetermined voltage in the electrical system. A second step, on the basis of an induced freewheeling voltage expected for one of the electrical machines, selects one of the inverters and actuating such that the electrical machine connected thereto is operated in electrical freewheel, with the result that the rotation of said machine induces a freewheeling voltage in the electrical system. A third step detects the rise above a second predetermined voltage for the induced electrical freewheeling voltage available in the electrical system. A fourth step actuates the inverter of the first electrical machine such that the first electrical machine connected thereto is operated in regulated generator mode.

20 Claims, 2 Drawing Sheets

(51) Int. Cl.
*B60L 3/04* (2006.01)
*B60L 11/14* (2006.01)
*B60L 7/14* (2006.01)

(52) U.S. Cl.
CPC ... *B60L 3/04* (2013.01); *B60L 7/14* (2013.01); *B60L 11/123* (2013.01); *B60L 11/14* (2013.01); *B60L 2210/40* (2013.01); *B60L 2240/421* (2013.01); *B60L 2240/427* (2013.01); *B60L 2260/28* (2013.01); *Y02T 10/6217* (2013.01); *Y02T 10/642* (2013.01); *Y02T 10/7077* (2013.01); *Y02T 10/7241* (2013.01)

(56) References Cited

U.S. PATENT DOCUMENTS

| | | | |
|---|---|---|---|
| 2010/0087976 A1* | 4/2010 | Aridome et al. | 701/22 |
| 2010/0125019 A1* | 5/2010 | Tabata et al. | 477/3 |
| 2010/0280737 A1* | 11/2010 | Ewert et al. | 701/102 |
| 2013/0154264 A1* | 6/2013 | Hatanaka et al. | 290/45 |

FOREIGN PATENT DOCUMENTS

| | | |
|---|---|---|
| EP | 2130734 | 12/2009 |
| WO | 2009083342 | 7/2009 |

* cited by examiner

METHOD FOR OPERATING AN ELECTRICAL SYSTEM, AND APPARATUS FOR CONTROLLING AN ELECTRICAL SYSTEM

BACKGROUND OF THE INVENTION

The present invention relates to a method for operating an electrical system, in particular of a motor vehicle, wherein the electrical system has at least one electrical energy store, in particular an electrical high-voltage energy store, and at least two electrical machines which are connected to the electrical system by means of a controllable inverter in each case, wherein a regulated generator mode of a first of the electrical machines is initiated for supplying electrical energy to the system.

The present invention also relates to an apparatus for controlling an electrical system, in particular of a motor vehicle, comprising voltage detection means for detecting an available voltage in the system, and a control unit which is designed to execute the above-described method.

Finally, the present invention relates to an electrical system, in particular for a motor vehicle, comprising an electrical energy store, in particular an electrical high-voltage energy store, and at least two electrical machines which are connected to the electrical system by means of a controllable inverter in each case, and comprising a control unit of the above-mentioned type.

In order to operate an electrical network in a hybrid motor vehicle, it is known, when detecting a malfunction of an electrical energy store, to electrically disconnect said electrical energy store from the network and to switch the electrical machine of the hybrid motor vehicle to a freewheeling mode in order to provide the network with a freewheeling voltage which is induced by the rotating electrical machine, which is mechanically driven by means of the drive train, and is used to reactivate the voltage regulation means. In this case, the freewheeling mode is initiated by opening the circuit breaker of the inverter and providing the network with the freewheeling voltage which is induced by the electrical machine with permanent-magnet excitation.

A method of this kind is known, for example, from WO 2009/083342.

The induced freewheeling voltage of an electrical machine is dependent on the rotation speed of the electrical machine. At very high rotation speeds or very low rotation speeds of the electrical machine, it is possible for the induced freewheeling voltage to be outside a permissible range. If the voltage is too low, the voltage in the network cannot be regulated. If the voltage is too high, components may be damaged by overvoltages.

SUMMARY OF THE INVENTION

Against this background, the invention provides a method of the type described in the introductory part for operating an electrical system, in particular of a motor vehicle.

One of the electrical machines is operated in freewheel mode depending on an expected induced freewheeling voltage level of one of the electrical machines, so that a freewheeling voltage is available in the electrical system before a regulated generator mode of a first of the electrical machines is initiated. To this end, the method comprises the following steps: in a first step, the situation of the electrical voltage which is available in the electrical system falling below a first predefinable voltage value is detected. Then, in a second step, one of the inverters, which is associated with one of the electrical machines, is selected depending on an expected induced freewheeling voltage level of one of the electrical machines. The selected inverter is actuated such that the electrical machine which is connected to it is operated in electrical freewheel mode. As a result of its rotation, the electrical machine induces a freewheeling voltage which is applied to the electrical system. In a subsequent third step, the situation of the induced electrical freewheeling voltage which is available in the electrical system exceeding a second predefinable voltage value is detected. Then, in a fourth step, the inverter of the first electrical machine is actuated such that the first electrical machine which is connected to it is operated as a generator.

The invention further provides an apparatus which is designed to execute the above-described method.

Finally, the invention provides an electrical system, in particular for a motor vehicle, comprising an apparatus of the above-described type.

In the present case, a regulated generator mode is understood to mean a mode of the electrical machine in which the circuit breakers of the associated inverter are actively, alternately actuated, in particular in a pulse-width-modulated manner, in order to provide the electrical system with an induced generator voltage which can be regulated.

A freewheeling voltage is induced and provided in the electrical system by means of the freewheeling mode of an electrical machine. In order to operate one of the electrical machines in the freewheeling mode, the circuit breakers of the associated inverter are opened. Therefore, the freewheeling voltage is induced and applied to the electrical system. This freewheeling voltage, which allows the regulated generator mode to be initiated, serves to provide a sufficiently high voltage in the electrical system. The predefinable second voltage value is selected such that it corresponds to the voltage level which is necessary for initiating the regulated generator mode.

According to the invention, the freewheeling voltage of one of the at least two electrical machines is used to provide the sufficiently high voltage in the electrical system. Said electrical machine can be, for example, an auxiliary drive which rotates at a different rotation speed to another electrical machine. This auxiliary drive can serve, for example, to drive the vehicle or to drive other components in the vehicle, for example as a drive of an air-conditioning compressor or an oil pump. The at least two electrical machines would therefore generate different freewheeling voltages in the freewheeling mode. In other words, according to the invention, not only one electrical machine can be used to provide the electrical system with the induced freewheeling voltage, but at least two electrical machines are available. Therefore, a sufficiently high freewheeling voltage, which is a prerequisite for initiating the regulated generator mode, in particular also an emergency mode, can be provided in a more reliable manner.

The situation of a predefinable voltage value being undershot or exceeded is detected by means of known methods for voltage measurement. As soon as the voltage measurement means detects a voltage value which falls below or exceeds a predefinable voltage value, a situation of a voltage value being undershot or exceeded is detected. This detection and further processing of this information and the control of the method and of the inverter are performed using means which are suitable for this purpose, in particular by a controller or a control electronics system.

By virtue of the present invention, a generator mode can be initiated with a relatively high degree of reliability since, when a plurality of electrical machines are present, that electrical machine of which the expected freewheeling voltage is suitable for initiating the regulated generator mode is selected for generating the freewheeling voltage. If only one electrical machine is available, there are many operating situations in which the freewheeling voltage which can be generated by the one electrical machine is either too low, since the electrical machine is, for example, stationary, or the freewheeling voltage which can be generated is too high, since the electrical machine rotates at an excessive rotation speed.

The method according to the invention is preferably used when the electrical energy store is disconnected from the electrical system during operation of the vehicle. "During operation of the vehicle" is understood to mean operation of the vehicle as intended, that is to say in particular when traveling from location A to location B at different speeds and with relatively short stationary periods, for example at crossroads or in traffic. "During operation of the vehicle" is not to be understood to mean, in particular, carrying out diagnoses of and repairs to the vehicle in a garage.

When the electrical energy store, that is to say in particular the high-voltage battery, is disconnected from the electrical system, the electrical voltage available in the electrical system falls below a minimum value within a short time. A regulated generator mode is then no longer possible. The difference between the actual value and the setpoint value of the voltage regulation is then too great. Depending on the design of the regulation path, the regulation becomes unstable. Voltage peaks which destroy the power electronics system can occur. The first predefinable voltage value according to the invention is predefined such that it corresponds to said minimum value.

If the freewheeling voltage, which is then applied to the electrical system, of one of the electrical machines exceeds the second predefinable voltage value, the inverter of the first electrical machine actuates the first electrical machine which is connected to it to operate as a generator. As a result of the rotation of said electrical machine, a generator voltage which is applied to the electrical system is now induced. This generator voltage is preferably regulated by means of a voltage regulation means. The voltage regulation means for the electrical system is embodied by suitable means and the controller in accordance with known methods. A changeover is therefore made from the controlled freewheeling mode to a regulated generator mode, as a result of which a predefinable generator voltage is made available to the electrical system.

It is further preferred when the first electrical machine is connected to a crankshaft of an internal combustion engine of the motor vehicle and is driven by the internal combustion engine during the generator mode. At least one further electrical machine is connected to another axle, another vehicle component or directly or indirectly to a wheel of the motor vehicle by means of a transmission means. As a result, the at least two electrical machines have substantially different rotation speeds during operation of the vehicle, so that different electrical freewheeling voltages can be induced and made available to the electrical system in the freewheeling mode.

It is further preferred when the at least two electrical machines are operated at different rotation speeds.

As a result, different freewheeling voltages are induced in the freewheeling mode, so that, for initiating an emergency mode or generator mode, an optimum freewheeling voltage can be made available to the electrical system depending on the respective rotation speed.

It is further preferred when the at least two electrical machines have different freewheeling characteristic curves.

As a result, different freewheeling voltages can be induced and provided to the electrical system even with identical rotation speeds.

It is further preferred to determine an expected induced freewheeling voltage of an electrical machine on the basis of its rotation speed and its freewheeling characteristic curve.

It is further preferred to select that electrical machine of which the expected induced freewheeling voltage deviates least from a predefined generator voltage setpoint value for the freewheeling mode.

As a result, the freewheeling voltage value which deviates least from a predefined generator voltage setpoint value can be made available to the electrical system. Therefore, voltage jumps and voltage peaks can be reduced when voltage regulation in the electrical system is resumed.

It is further preferred when that electrical machine of which the expected induced freewheeling voltage lies outside a permissible voltage range is not operated in the freewheeling mode. This prevents a freewheeling voltage which is too low to initiate a reliable regulated generator mode or which is too high, and as a result damages sensitive components, from being made available to the electrical system.

The first and the second predefinable voltage values are preferably predefined to have the same magnitude. Therefore, the method can be implemented more simply. A computer program for implementing the method requires fewer resources in this case.

It is generally preferred when the controlled generator mode of the first electrical machine is performed by means of a pulse-width-modulation method. Therefore, a low-loss and optimized generator mode is performed for generating a predefinable generator voltage.

It is generally preferred when an electrical machine is in the form of a synchronous machine with permanent-magnet excitation. As a result, an electrical freewheeling voltage can be induced by changing over to the freewheel mode without electrical energy being supplied.

BRIEF DESCRIPTION OF THE DRAWINGS

It goes without saying that the features, properties and advantages of the control unit according to the invention also apply or can be applied to the method according to the invention, and vice versa.

DETAILED DESCRIPTION

Figure 1:
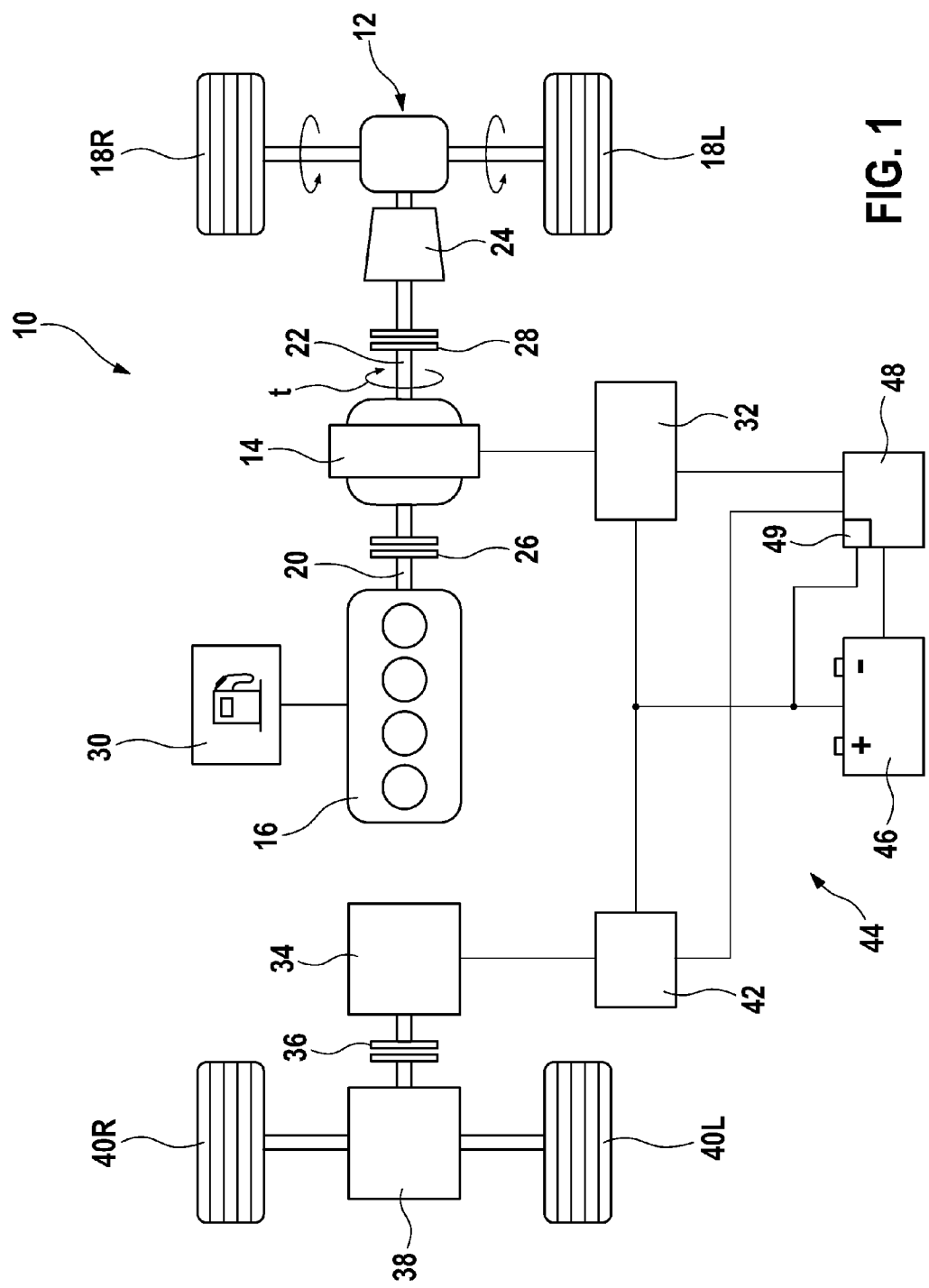
FIG. 1 shows, in schematic form, a motor vehicle comprising a hybrid drive train and an additional electrical machine for driving the motor vehicle.

A motor vehicle is schematically illustrated and designated 10 in general in FIG. 1. The motor vehicle 10 has a drive train 12 which, in the present case, contains an electrical machine 14 and an internal combustion engine 16 for providing drive power. The drive train 12 serves to drive driven wheels 18L, 18R of the vehicle 10.

The internal combustion engine 16 is connected or can be connected to an, in particular to a first, electrical machine 14 by means of a crankshaft 20. The internal combustion engine 16 and an electrical machine 14 can provide a torque t and an adjustable rotation speed at an output shaft 22. The output shaft 22 is connected or can be connected to a gear mechanism unit 24 in order to transmit the torque t to the driven wheels 18R, 18L. In the present case, the crankshaft 20 and the output shaft 22 have a respective clutch 26, 28 in order to connect the internal combustion engine 16 to the electrical machine 14 and, respectively, to connect the electrical machine 14 to the gear mechanism unit 24.

The drive train 12 can be designed to drive the motor vehicle 10 solely by means of the electrical machine 16. As an alternative, the electrical machine 16 can be part of a hybrid drive train 12, as in the present case.

The crankshaft 20 is connected or can be connected to a rotor of the electrical machine 14 by means of the clutch 26 in order to transmit a rotation speed or a torque to the electrical machine 14. The rotor of the electrical machine 14 is connected to the output shaft 22 in order to transmit the torque t to the gear mechanism unit 24. In this case, the torque t is formed by the sum of the individual torques which are provided by the internal combustion engine 16 and the electrical machine 14.

In the motor mode, the electrical machine 14 generates a drive torque which assists the internal combustion engine 16, for example in an acceleration phase. In the generator or recuperation mode, the electrical machine 14 is driven by the rotating output shaft 22, which is connected to the wheels 18R, 18L of the vehicle, and generates electrical energy which is made available to the vehicle 10 in general.

The internal combustion engine 16 is supplied with fuel by a fuel tank 30.

The electrical machine 14 can be of two-phase or polyphase design and is actuated by means of a power electronics system 32 or an inverter 32 or a pulse-controlled inverter 32 and supplied with electrical energy.

The motor vehicle 10 further has a further, in particular a second, electrical machine 34 which can be connected to the wheels 40R, 40L of the vehicle 10 by means of a clutch 36 and a gear mechanism 38. The electrical machine 34 serves to provide additional drive power for driving the wheels 40R, 40L. The electrical machine 34 further serves to generate energy and to make said energy available to the vehicle 10 in general in the generator or recuperation mode when the rotating wheels 40R, 40L drive the electrical machine 34.

The electrical machine 34 can be of two-phase or polyphase design. Said electrical machine is controlled by means of a power electronics system 42 or an inverter 42 or a pulse-controlled inverter 42 and connected to the electrical system. The electrical machines 14, 34 are preferably in the form of synchronous machines with permanent-magnet excitation.

The inverters 32, 42 are connected to an energy supply unit 46, for example a DC voltage supply (for example rechargeable battery, battery or high-voltage battery) 46 of the vehicle 10 by means of an electrical system 44, in particular a high-voltage system 44. The inverters 32, 42 and the energy supply unit 46 and the electrical system 44 are connected to a controller 48 or a control electronics system 48 which is designed to regulate the voltage which is applied to the electrical system 44, in particular to control and to monitor the total energy supply to the electrical machines 14, 34, the state of charge of the energy supply unit 46 and the electrical system 44. The controller 48 and the voltage regulation means 48 contained therein have, in particular, an associated voltage measurement device 49 for this purpose. The individual electronic functions of the controller 48 mentioned here can be associated as desired in a distributed manner to different control units of the drive train, for example to the inverters 32, 42.

The motor vehicle 10 has, in particular, a low-voltage system (not illustrated in FIG. 1) with a separate battery for supplying controllers of the motor vehicle 10 with a low voltage. The low-voltage system in particular supplies energy to the controller 48 and actuates the circuit breakers of the inverters 32, 42 for example for the freewheeling mode and for the generator mode. In this case, the electrical system 44 and the low-voltage system are preferably connected by means of a DC/DC converter for exchanging electrical energy.

The electrical machines 14, 34 can both be operated as generators separately in a generator mode or recuperation mode. In this case, the electrical machines generate a generator voltage which is fed to the electrical system 44 in a voltage-regulated manner by means of the respective inverters 32, 42. This electrical energy is therefore provided to other loads of the motor vehicle 10 and/or used to charge the energy supply unit 46.

In order to operate the electrical machines 14, 34 in the regulated generator mode, the electrical machines 14, 34 are preferably actuated in a specific manner, in particular in a pulse-width-modulated manner, by means of the inverters 32, 42.

The inverters 32, 42 have a plurality of circuit breakers, which are connected up in a plurality of half bridges, for correspondingly actuating the electrical machines 14, 34. The electrical machines 14, 34 are controlled by means of these circuit breakers both in the motor mode and in the generator mode.

If the electrical energy supply unit 46 is electrically decoupled from the electrical system 44, the controller 48 attempts to maintain or re-initiate a generator mode of a first electrical machine 14 in order to ensure the regulated supply of electrical energy to the electrical system 44. If the first electrical machine 14 has already been operated as a generator when the energy supply unit 46 is disconnected, it is possible to continue the regulated generator mode. If neither of the machines 14, 34 has been operated as a generator when the energy supply unit 46 is disconnected, the voltage in the electrical system 44 drops very rapidly. When the loads, for example electrical machines 14, 34 or the DC/DC converter for supplying the low-voltage system, are connected to the electrical system 44, the voltage can drop to 0 volts within a few milliseconds. It is not possible for an electrical machine to assume the regulated generator mode at a system voltage of only a few volts. The regulation would be unstable owing to the large deviations between the actual value and the setpoint value for the voltage regulation. This would result in large voltage jumps and voltage peaks and these would destroy the power electronics system. If the voltage in the electrical system 44 falls below a first predefinable voltage value, an inverter 32, 42 is selected, according to the invention, depending on an expected induced freewheeling voltage of one of the electrical machines 14, 32, said inverter being associated with said electrical machine. The selected inverter 32, 42 is actuated such that the electrical machine 14, 34 which is connected to it is operated in electrical freewheel mode and a freewheeling voltage is induced as a result of the rotation of said electrical machine. Said freewheeling voltage is applied to the electrical system 44. All of the circuit breakers are open in the freewheel mode of an electrical machine, so that the electrical voltage which is induced by the corresponding electrical machine 14, 34 is rectified by means of freewheeling diodes, which are connected in parallel with the circuit breakers in the inverters 32, 42, and is correspondingly fed to the electrical system 44.

If the freewheeling voltage which is now applied to the electrical system 44 exceeds the second predefinable voltage value, the inverter 32 of the first electrical machine 14 is actuated such that the first electrical machine 14 which is connected to it is operated as a generator. The machine 14, which is driven by the internal combustion engine, now induces a generator voltage, which is applied to the electrical system 44 and can be regulated by means of a voltage regulation means 48, as a result of the rotation of said machine. A changeover is therefore made from the uncontrolled freewheeling mode to a regulated generator mode, as a result of which a predefinable generator voltage is made available to the electrical system 44. The voltage regulation means 48 for the electrical system is embodied by suitable means and the controller 48 in accordance with known methods for this purpose.

The required minimum voltage in the system 44 for initiating and operating the circuit breakers of the inverters 32, 42 for a regulated generator mode is usually approximately 70 V.

Since the electrical machines 14, 34 have different rotation speeds owing to the preferably different interconnected gear mechanisms 24, 38, and preferably have different freewheeling characteristic curves, that is to say provide different freewheeling voltages in the freewheeling mode at identical wheel rotation speeds of the vehicle, that one of the two electrical machines 14, 34 which induces an electrical freewheeling voltage which deviates least from a predefined generator voltage setpoint value can be selected for the freewheeling mode.

If the motor vehicle 10 has more than two electrical machines 14, 34, for example in the form of wheel-hub drives or other auxiliary drives, the controller 48 can select one of the electrical machines 14, 34, which induces an electrical freewheeling voltage which deviates least from a predefined generator voltage setpoint value, on the basis of the measured respective rotation speed and the freewheeling characteristic curve. That electrical machine 14, 34 which induces an electrical freewheeling voltage within a predefined voltage range is selected in this case.

Therefore, overall, the further regulated supply of electrical energy to the motor vehicle 10 can be ensured when the electrical energy store 46 is disconnected from the electrical system 44.

Figure 2:
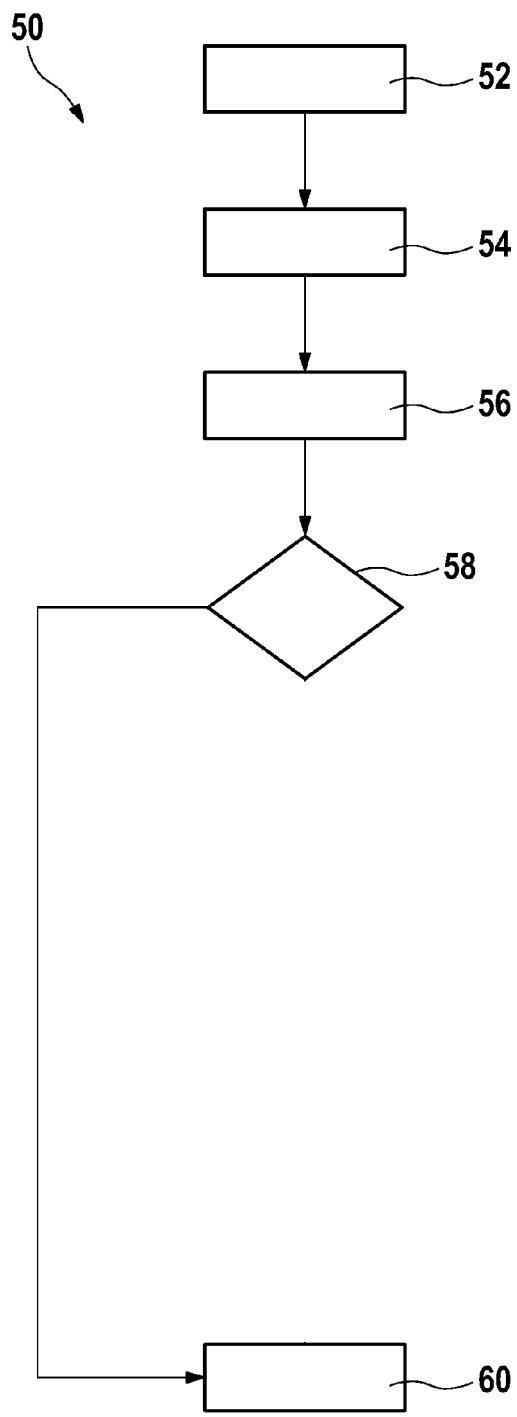
FIG. 2 shows, in schematic form, a flowchart for a method for operating an electrical system.

A flowchart for a method for operating an electrical system is schematically illustrated and designated 50 in general in FIG. 2.

The method 50 is initiated, for example, by disconnecting the electrical energy store 46 from the electrical system 44 during operation of the vehicle, as is shown at 52. Then, at 54, the situation of a first predefinable voltage value being undershot in the electrical system 44 is detected. Thereafter, at 56, one of the inverters 32, 42, which is associated with one of the electrical machines 14, 32, is selected depending on an expected induced freewheeling voltage of one of said electrical machines 14, 32, and the selected inverter 32, 42 is actuated such that the electrical machine 14, 34 which is connected to it is operated in electrical freewheel mode. A freewheeling voltage which is applied to the electrical system 44 is induced as a result of the rotation of said electrical machine.

At 58, a check is made to determine whether the freewheeling voltage which is now applied to the electrical system 44 exceeds the second predefinable voltage value. If the second predefinable voltage value is exceeded, the regulated generator mode of the first electrical machine 14 is initiated at 60. To this end, the inverter 32 of the first electrical machine 14 is actuated such that the first electrical machine 14 which is connected to it is operated as a generator. A generator voltage which is applied to the electrical system 44 and which can be regulated using the voltage regulation means 48 is induced as a result of the rotation of said first electrical machine.

The invention claimed is:

1. A method for operating an electrical system of a motor vehicle wherein the electrical system has at least two electrical machines connected to the electrical system each by a controllable inverter, wherein a regulated generator mode of a first of the electrical machines is initiated, the method comprising:

in a first step, detecting whether an electrical voltage in the electrical system falls below a first predefined voltage value, in a second step, depending on an expected induced freewheeling voltage of one of the electrical machines, selecting one of the inverters and actuating such inverter such that the electrical machine which is connected to the selected inverters is operated in electrical freewheel mode, so that said electrical machine, as a result of its rotation, induces a freewheeling voltage which is applied to the electrical system, in a third step, detecting whether the freewheeling voltage in the electrical system exceeds a second predefined voltage value, and in a fourth step, the inverter of the first electrical machine is actuated such that the first electrical machine is operated in the regulated generator mode.

2. The method as claimed in claim 1, wherein the electrical system has at least one electrical energy store and wherein the regulated generator mode of the first of the electrical machines (14, 34) is initiated during operation of the vehicle after disconnection of the electrical energy store from the electrical system to supply electrical energy to the electrical system.

3. The method as claimed in claim 1, wherein the electrical system has a voltage regulator which regulates an induced generator voltage in the electrical system in the regulated generator mode of the first electrical machine.

4. The method as claimed in claim 1, wherein the first electrical machine is connected to a crankshaft of an internal combustion engine of the motor vehicle, and a second electrical machine of the at least two electrical machines is connected to an axle of the motor vehicle (10).

5. The method as claimed in claim 1, wherein the first electrical machine and the second electrical machine are operated at different rotation speeds.

6. The method as claimed in claim 5, wherein the first electrical machine and the second electrical machine have different freewheeling characteristic curves.

7. The method as claimed in claim 1, wherein the regulated generator mode of the first electrical machine is performed by a pulse-width-modulation method.

8. The method as claimed in claim 1, wherein the first and the second predefined voltage values have the same magnitude.

9. The method as claimed in claim 1, wherein the electrical system is an electrical system of a motor vehicle.

10. The method as claimed in claim 1, wherein the least one electrical energy store, is an electrical high-voltage energy store.

11. The method as claimed in claim 1, wherein the first electrical machine is connected to a crankshaft of an internal combustion engine of the motor vehicle, and a second electrical machine of the at least two electrical machines is connected to a wheel of the motor vehicle.

12. The method as claimed in claim 1, wherein an expected induced freewheeling voltage of each respective electrical machine is determined on the basis of a respective rotation speed.

13. The method as claimed in claim 1, wherein an expected induced freewheeling voltage of a respective electrical machine is determined on the basis of a respective freewheeling characteristic curve.

14. The method as claimed in claim 6, wherein the expected induced freewheeling voltage of the respective electrical machine is determined on the basis of the respective rotation speed and the respective freewheeling characteristic curve.

15. The method as claimed in claim 14, wherein the regulated generator mode of the first of the electrical machines is initiated to generate a generator voltage in the electrical system with a predefined generator voltage setpoint value, wherein the electrical machine that is operated in electrical freewheel mode has an expected induced freewheeling voltage that deviates least from a predefined generator voltage setpoint value.

16. The method as claimed in claim 14, wherein an electrical machine of the at least two electrical machines of which an expected induced freewheeling voltage lies outside a permissible voltage range is precluded from being used as the electrical machine that is operated in electrical freewheel mode for generating the freewheeling voltage in the electrical system.

17. An apparatus for controlling an electrical system, comprising a voltage detector configured to detect an electrical voltage in the electrical system, and a control unit which is configured to execute the method as claimed in claim 1.

18. The apparatus of claim 17, wherein the electrical system, further comprises: an electrical energy store, and at least two electrical machines which are connected to the electrical system by a controllable inverter in each case, and a control unit.

19. The apparatus as claimed in claim 17, wherein the electrical system is an electrical system of a motor vehicle.

20. The electrical system, as claimed in claim 18, wherein the electrical system is an electrical system of a motor vehicle and the electrical energy store is an electrical high-voltage energy store.

* * * * *